United States Patent [19]

Guillaume

[11] 4,272,172

[45] Jun. 9, 1981

[54] APPARATUS FOR MAKING PHOTOGRAPHIC PICTURES

[75] Inventor: Emile A. H. Guillaume, Ballaigues, Switzerland

[73] Assignee: Zelacolor Systems Establishment, Vaduz, Liechtenstein

[21] Appl. No.: 25,946

[22] Filed: Apr. 2, 1979

[30] Foreign Application Priority Data

Apr. 7, 1978 [CH] Switzerland ..................... 3749/78

[51] Int. Cl.³ .............................................. G03B 17/44
[52] U.S. Cl. .................................... 354/161; 354/100; 355/32
[58] Field of Search ............... 354/100, 202, 216, 212, 354/161; 355/32, 72

[56] References Cited

U.S. PATENT DOCUMENTS

| | | | |
|---|---|---|---|
| 1,379,189 | 5/1921 | King | 354/161 |
| 3,984,849 | 10/1976 | Guillaume | 354/100 |

FOREIGN PATENT DOCUMENTS 309227 4/1920 Fed. Rep. of Germany ........... 354/216

*Primary Examiner*—John Gonzales
*Attorney, Agent, or Firm*—Ostrolenk, Faber, Gerb & Soffen

[57] ABSTRACT

An apparatus for making photographic pictures is disclosed comprising a housing provided with an objective; a magazine or cassette containing a film feed mechanism; and a device for positioning at least one mask in the light rays in the interior of the apparatus between the objective and the film and adjacent to the film plane.

The apparatus is useful to effect masking operations during the normal photographic operations of imaging.

8 Claims, 10 Drawing Figures

APPARATUS FOR MAKING PHOTOGRAPHIC PICTURES

BACKGROUND OF THE INVENTION

This invention is concerned with the making of photographic pictures like records, separations and all other images on a film.

More particularly, the invention is related to an apparatus for making photographic pictures allowing a masking during the imaging process.

In photographic art in general, and in the polygraphic industry in particular, the so-called masking operation is an important step or technique in order to obtain high quality copies or prints from originals. The masking operations are generally carried out in the laboratory, and their complexity considerably raises the price of photographic work where such masking is necessary. The masking operation comprises placing a mask realized beforehand, on a film to be sensibilized. The man skilled in the art perfectly knows these operations including color corrections on color separations realized for printing purposes.

SUMMARY OF THE INVENTION

A first object of the invention is to provide an apparatus for making photographic pictures allowing the performing of masking operations.

A further object of this invention is to provide an apparatus of the depicted kind which directly allows to obtain an original with masking, during the taking of the picture, and not after having already taken the picture as it has been the case until now.

Thus, considerable time and work could be saved if a photographic apparatus would allow the masking during the photographic imaging operation and not only afterwards.

The apparatus of this invention fullfills the above objects. It comprises a device arranged to position at least one mask into the path of light rays in the interior of the apparatus between the objective and the film. Said mask positioning device preferably places the mask in the proximity of the film plane.

In the following specification, the expression "photographic imaging apparatus" designates an apparatus like a camera which is arranged to make reproductions or prints from a real or photographed subject by the well-known photographic process, be it in color or not.

The mask positioning device comprises fixing means allowing a precise alignment of the mask on the device, and is further provided with fixing and positioning means for a precise alignment relative to the apparatus.

The mask positioning device can be provided with at least two alignment pins adapted to enter corresponding bores in the masks, and said pins are located on the contact surface of the mask.

The mask positioning device can be provided with a housing, a shutter being mounted in front of the mask. The fixing and positioning means between that housing and the apparatus have supporting surfaces and/or grooves and alignment pins; the housing will be placed at the rear of the apparatus.

The housing can be provided with a rear cover, situated behind the mask and arranged to be replaced by a film magazine or cassette comprising film transporting means, or by a sighting device.

The fixing and positioning means between the mask positioning device and the apparatus can be fitted with a spindle around which this means can pivot, and a catch stopper.

The apparatus may further be provided with a film transport mechanism or film feed device, which is arranged to retreat the film from its contact with the mask in order to have it make an advancing motion. The retreating motion of the film can be realized by a pivoting movement about a lateral axle of the film advancing mechanism or by a translation movement of the mechanism.

The mask positioning device, when pivotably mounted on a rotation spindle, also comprises a back cover mounted on the same spindle, and the entire unit is provided in the interior in a film magazine or cassette comprising the film advance mechanism. The rotation spindle of the mask positioning device is then provided laterally on the opposite side of the pivoting axle of the film advance mechanism, and a control rod is provided to release the device cover and to bring the film in contact with the mask, and vice versa.

BRIEF DESCRIPTION OF THE DRAWING

In the drawing, several preferred embodiments and variants of the apparatus according to the invention are represented. In the drawing.

DESCRIPTION OF THE PREFERRED EMBODIMENTS

The photographic imaging apparatus shown in FIGS. 1 to 7 is arranged and designed to produce photographic film images combined with a masking operation effected simultaneously with the imaging operation and not separately and successively as it is the case in the prior art. This apparatus 1 comprises a housing 2, a removable magazine 3 and an intermediate housing for, removable also and placed between housing 2 and magazine 3. The intermediate housing 4 is provided with a device for the insertion and the exposure of the mask, see detailed description below. The housing 2 is of conventional construction and has a rear portion 5. On its lower surface, a threaded bore 6 for the fixing of the apparatus 1 on a stand or tripod (not shown) as well as a toothed rack 7 directed to the front are provided. The rack 7 allows displacement of an objective support 8 by means of a knob 9. Support 8 bearing an objective 10 and provided with diaphragm and shutter in the conventional kind, is connected to the rear portion 5 by a bellows 11. The objective 10 can therefore be displaced when knob 9 is rotated in order to adjust the proper distance. The rack 7 has, on its free end, a stop abutment 12 so that the support 8 cannot go out of the rack 7.

The rear portion 5 is provided, at its lower part, with a protruding horizontal rail 13 defining a groove 14 wherein a corresponding rib 15 of the intermediate housing 4 can be inserted. This intermediate housing 4 is fixed at its upper portion by a hook or latch 16 to the rear portion 5. The intermediate housing 4 can therefore be removed from the rear portion 5 of housing 2 when pressure is exerted onto the rear end of hook 16, then the two upper portions of the housings 2 and 4 are slightly moved apart, and housing 4 is finally taken out of the groove 14. The two pieces are put together in an analogous manner. The positioning of intermediate housing 4 against housing 2 is facilitated by two positioning pins 17 on the intermediate housing 4 which enter corresponding bores 18 of the rear portion 5 of the housing 2. The rear end of the intermediate housing 4 (see also FIG. 4) is provided with a cover 19 pivotably journalled on an axle 20. This cover 19 is a U-shaped trilateral frame having at its interior surfaces, which form the U, a groove 21 (see FIG. 4) adapted to receive a simple closure 22 shown in FIG. 4 or the frame 22a of a sighting device 23 represented in FIG. 5 and shown in a sectional view, in FIG. 2, or the magazine 3 with a film as shown in FIGS. 1 and 3.

Figure 1:
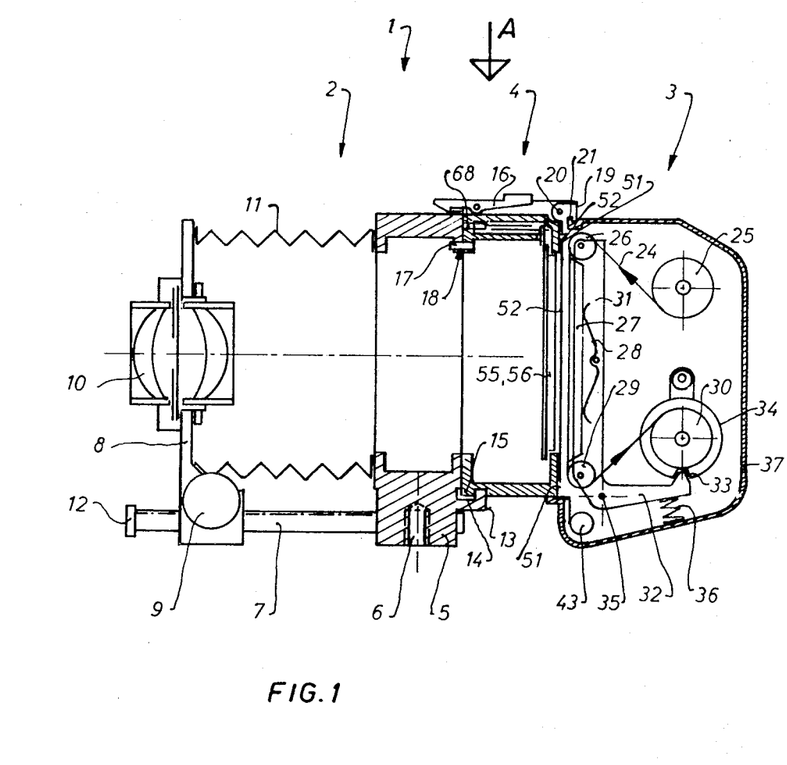
FIG. 1 is a longitudinal sectional view of a first embodiment of a photographic imaging apparatus, having a housing and a removable magazine, and an intermediate housing arranged for receiving a mask being inserted between said apparatus housing and said magazine.
Figure 2:
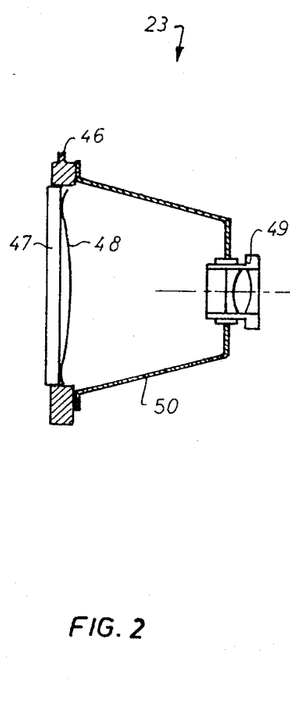
FIG. 2 is a sectional view of a signting device to be placed on the intermediate housing of the apparatus according to FIG. 1, when the magazine has been removed.
Figure 3:
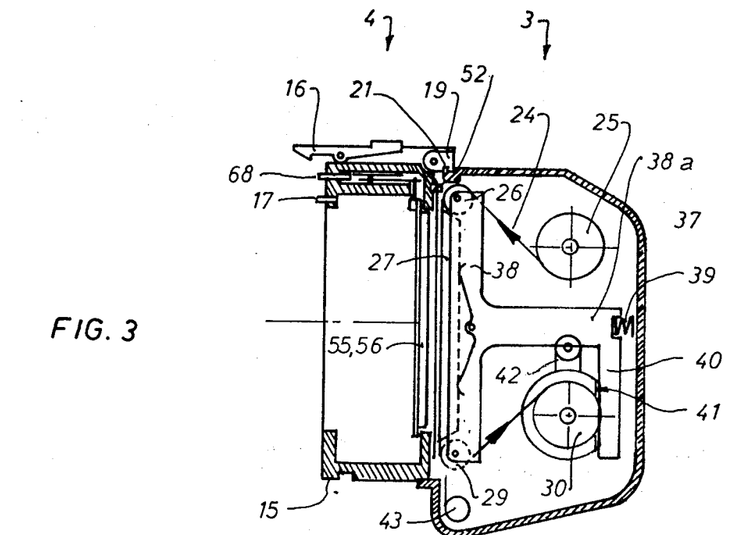
FIG. 3 represents a sectional view of a magazine variant to be used with the apparatus of FIG. 1, the magazine variant being shown together with the intermediate housing.
Figure 4:
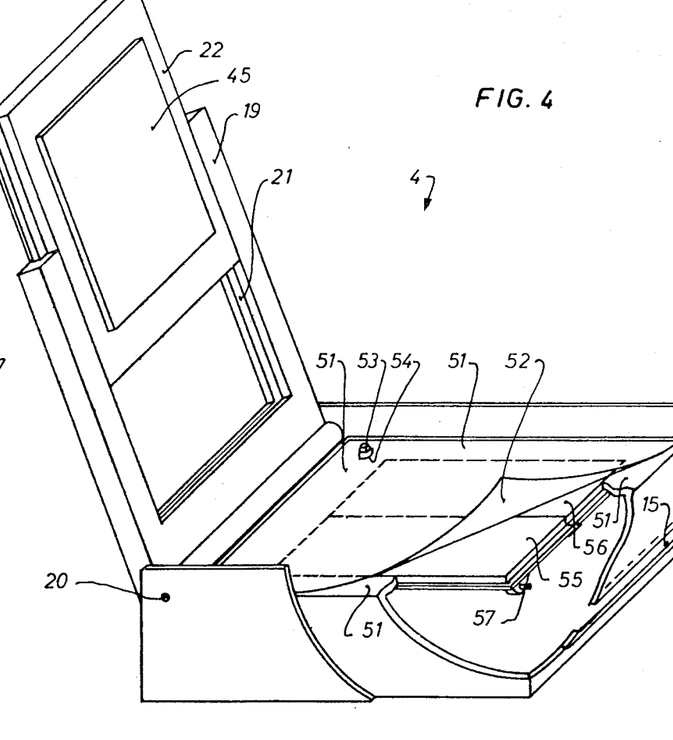
FIG. 4 is a perspective view of the intermediate housing of the apparatus as shown in FIGS. 1 to 3.
Figure 5:
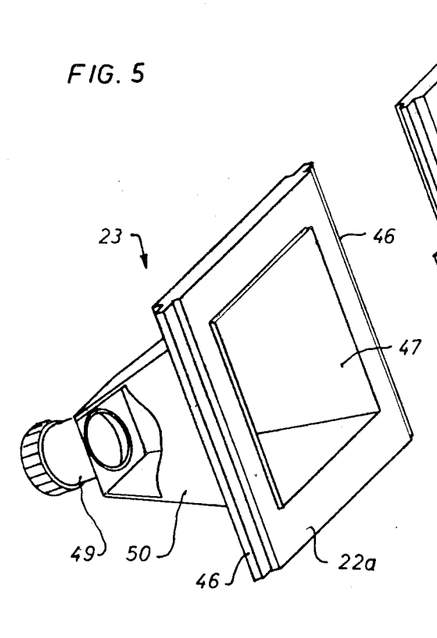
FIG. 5 shows a perspective view of the sighting device which is represented as a sectional view in FIG. 2.

The magazine 3 can thus be introduced from below, as shown in FIG. 1, into the U-shaped frame 19 of the intermediate housing 4. The film 24 in the magazine 3 comes out of a supply reel 25, goes around an upper guide roller 26 and then to a film presser 27 biassed by a spring 28, around a lower guide roller 29, and is then wound upon a bobbin or reel 30. The roller 26 and 29, the film presser 27 and the spring 28 are mounted on an arm 31 having a bent-away lever arm 32 which is captured in a notch 33. This notch 33 is cut into one of the circular edges of the receiving bobbin 30. The arm 31 is mounted pivotably about an axle 35 and is biassed into notch 33 by a spring 36 inserted between the lever arm 32 and the interior surface of the wall 37 of the magazine 3.

The transport of film 24 within the magazine 3 is operated in the following way. When the take-up bobbin 30 is rotated in the clockwise direction, the lever arm 32 leaves the notch 33 and slides on the circular edge 34 of bobbin 30 during one complete rotation of said bobbin. The arm 31 has pivoted about its axle 35 when the tip of the lever arm 32 has left the notch 33, so that the film transport during the 360° rotation of the receiving bobbin is effected with arm 31, guide rollers 26 and 29 and film presser 27 in a retreated position relative to the film contacting surfaces of the magazine. In this way, any friction of the film on its contact surfaces defined by the rear wall of intermediate housing 4 or by a mask, is positively avoided.

When the bobbin 30 has made a complete rotation, notch 33 comes in facing relationship with the tip of the lever arm 32, and spring 36 pushes the lever arm upwardly so that said tip enters notch 3 and arm 31 is swivelled, pressing the film 24 against its contact surfaces of the intermediate housing 4 or a mask.

In the variant of the magazine 3, shown in FIG. 3, the film advancing and transporting mechanism comprises the supply reel 25, the receiving bobbin 30, the guide rollers 26 and 29, and the film presser 27 with its spring 28. The film presser and the guide rollers are mounted on a T-shaped arm 38; its T shaft 38a bearing at its end a spring 39. The other end of spring 39 rests against the inner wall of the housing wall 37. The T shaft 38a of arm 38 has a downwardly directed prolongation 40 engaging a cam 41 on bobbin 30. A crank handle 42 is provided to rotate the receiving bobbin 30 which, at the beginning of a rotation of 360°, pushes with its cam 41 the prolongation 40 and thus the arm 38 to the rear, against the action of spring 39. The film presser 27 and the two guide rollers 26 and 29 which bear the film 24 are retracted, and the advance of film 24 is effected while it is out of contact with its contact surfaces.

The man skilled in the art will understand that, in the apparatus variant shown in FIG. 3, the film transportation can only be started after the retreat of the film from its contact surfaces, parallel to its original or exposure plane, whereas in the embodiment of FIG. 1 the film transportation takes place after the film retreat by pivoting about an axle 35 arranged laterally relative to the film plane.

As it has already been mentioned, the separation of the film (during its advance) from its contact surfaces (generally the surface of a mask as explained below) permits avoidance of any friction of the film surface on the sensitive mask surface. The intermediate housing 4, shown in FIG. 3, is identical to that of FIGS. 1 and 2. The magazine 3 is thus connected to the apparatus 1 by insertion, from below, into the grooves 21 of the cover 19, and at the end of the course, a spring pawl 43 (see FIGS. 1 and 3) ascertains the holding of the magazine.

Instead of the magazine 3, the cover 19 may receive a simple closure plate 22 (FIG. 4) having a central contact portion 45 freely mounted on the interior of the closure plate 22 via a spring (not shown). The portion 45 of the plate 22 serves as a film presser when a film mask is prepared; this will be explained later.

The sighting device 23 (see FIGS. 2 and 5) has lateral ribs 46 which allow the introduction of this device 23 into the grooves 21 of the cover 19. The sighting device 23 further comprises a diffusing screen 47 forwardly biassed by a spring 48, see FIG. 2, so that it may be pushed against the film contact surfaces of the intermediate housing 4. The device 23 also comprises an ocular 49 connected to the frame 22 by a casing 50.

The intermediate housing shown in FIGS. 1, 3, 4, 6 and 7 has contact surfaces 51 which form a frame on which a mask 52 is normally applied. The supporting frame, formed by surfaces 51, has on its upper side two positioning pins 53 that enter corresponding bores 54 in the mask 52. Behind the mask 52, there are two shutter covers 55 and 56 the pivoting axles 57, 58 of which are arranged laterally in the housing 4 (see also FIGS. 6 and 7). Opening fingers 59 and 60 are arranged on the upper, enlarged portion 61, 62 of the covers 55, 56 in a position slightly offset to axles 57 and 58 against the interior of the housing. The fingers 59 and 60 traverse meniscal-shaped slots 63 and 64 of an upper plate 65 which bears the upper end of the axles 57 and 58 as well as an opening device comprising a T-shaped piece 66 (see FIG. 6) pivotably journalled at 67, the T-shaft being attached by a shutter pin 68. One of the opposing T branches is connected to the opening finger 59 whereas the other one is connected by a control rod 69 to the other opening finger 60. Finger 59 is further connected to the rod 69 by a spring 70. When the shutter pin 68 is pushed down, T-shaped piece 66 pivots about its axle 67 in clockwise direction and further moves fingers 59 and 60 which then travel within meniscular slots 63 and 64. In this way, the covers 55 and 56 are opened like window blinds. In FIGS. 1 and 3, it can be seen that the shutter pin 68 of the intermediate housing 4 is automatically pushed down by the adjacent surface of the rear portion 5 when the intermediate housing 4 is pressed home against housing 2. Covers 55 and 56 thus automatically open when intermediate housing 4 is applied against the rear portion 5 of housing 2, and they automatically close due to the tension of spring 70 (see FIG. 6) when the intermediate housing 4 is separated from housing 2.

The apparatus shown in FIGS. 1 to 7 operates as follows:

It will first be assumed that a real subject should be photographed, e.g. a color diapositive should be made with a masking effect to correct colors. To do this, a color correction film mask will be used which will be exposed and placed into the intermediate housing before mounting on a tripod (not shown) which will be screwed in from below into the threaded bore 6 of the housing 2. The intermediate housing 4 is then fixed to the rear portion 5 of housing 2 after having introduced the sighting device 23 into the intermediate housing. Then the shutter 10 of objective 10 is opened, and the image framing is effected followed by the usual distance and luminosity adjustments of the image formed on the diffusing plate 47 of the sighting device 23. After the end of all adjustments, the apparatus must not be displaced or otherwise disturbed. The hook 16 is now operated, and the intermediate housing 4 bearing the sighting device 23 is separated from housing 2 which remains on the tripod. In a dark chamber, the cover 19 is opened, the sighting device 23 is removed from the intermediate housing 4 and a film 52, (e.g. a simple black-and-white film) is placed on the positioning pins 53 since only one color correction is being made. Film 52 is applied against the surfaces 51, and plate 22 (see FIG. 4) is slid into the grooves 21 of cover 19 until the closure of spring pawl 43; the cover 19 is closed over the film 52. One can now leave the dark chamber since intermediate housing 4 is closed. The intermediate housing 4 is now introduced against rear portion 5 of housing 2. As already been mentioned, the covers 55 and 56 which protect the film 52 from daylight automatically open by the action of the shutter pin 68 when the intermediate housing 4 is placed against the rear portion 5 of housing 2.

The film 52 is now ready for exposure, and since it is a color correction film, the appropriate filter should be placed before the objective in order to obtain the desired color correction. The color correction filters and the film used for masking operations will not be described in detail since these techniques and the materials necessary for their executive are perfectly well known to the man skilled in the art.

When the appropriate filter (not shown) has been placed in front of the objective 10, a photograph can be taken to sensibilize the film 52 which acts as a film mask. Once the photograph is taken, the filter (not shown) before the objective 10 is removed, and the intermediate housing 4 is separated from the rear portion 5 of housing 2, bearing in mind the caution not to displace or disturb the housing 2 on its tripod.

When the intermediate housing 4 is separated from housing 2 and their adjacent surfaces are moved apart, spring 70 (see FIG. 6) immediately closes the covers 55 and 56, and the film mask 52 now sensibilized is protected from environmental light. In the dark room, cover 19 of the intermediate housing 4 is opened, film 52 is removed, developed, and fixed. It is dried and replaced on the positioning pins 53. The plate 22 is drawn from its cover frame 19, and magazine 3 is introduced in the grooves 21 (see FIGS. 1 or 3). Cover 19 over the magazine 3 is closed, and the plane of the film 24 which is in the magazine 3 comes now in surface contact with the film mask 52. Now, the unit formed of the intermediate housing 4 and the magazine 3 is placed against the rear portion 5 of housing 2 which is still on the tripod (not shown) in its adjusted position. When this placing is effected, the covers 55 and 56 of the intermediate housing 4 opens automatically once more, and a photograph can be taken on the film 24 whereby the light rays coming from the subject traverse first the film mask 52 whereon film 24 is in superficial contacting relationship. In this way, an image is formed which has automatically been corrected in colors by masking. Now, it is possible to develop the photograph, or more photographs can be taken, be it for confirmation or be it for the production of other images, the placement of other filters before the objective 10 being of course possible.

It should be noted that all operations described until now will be effected in practice much more rapidly than the description could proceed.

It should further be noted that the apparatus shown in FIGS. 1 to 7 can be used much more universally as described. The description of a special use comprising the photographic imaging of a color image together with a correction mask has been selected due to its relative simplicity and to the fact that it permits a most simple and clear description of the operation. Those skilled in the art know that there exist other masks than black and white ones used for color corrections. There are color retracting masks as well as a plurality of masks for special effects, which can be prepared inside or outside the camera. Such special masks are e.g. transparent ones bearing a text to be superimposed on a photograph. It should be clear that all such masks can be used in the camera of the invention. On the other hand, the inventor has found that he could superimpose a plurality of masks within the intermediate housing 4. It is therefore possible to place on the positioning pins 53, e.g. one color correction mask, then a transparent text bearing mask, etc. All possible mask combinations will be possible.

The apparatus of the invention is particularly useful to make series of photographs combined with masking operations. The apparatus shown in FIGS. 1 to 7 can be used to prepare directly color separations from a particular real subject, and the separations will be obtained after the realisation of the film mask when appropriate filters (not shown) are placed in front of the objective 10 of the apparatus. Another use of the apparatus shown in FIGS. 1 to 7 is the preparation and realisation of color catalogs representing a plurality of objects which can now directly be photographed in separations together with masking operations and/or addition of transparent patterns realized outside the camera.

In addition to the numerous uses briefly mentioned above, the apparatus of the invention is capable of realizing photographs having outstanding quality. In fact, the sighting with the device 23 is effected in the film plane, i.e. exactly between the mask and the film. Even if a plurality of masks is superimposed in the intermediate housing 4, the adjustments can always be made in the film plane, i.e. between the last mask and the film 24 unwound in magazine 3. On the other hand, the film mask 52 and the film 24 in magazine 3, be it that of FIG. 1 or of FIG. 3, can be placed with their gelatine layers facing each other whereby the two imaging planes are nearly identical. In order to warrant a perfect image quality, the inventor has designed the film 24 transporting means in such a manner that any friction between the film mask or masks and the film 24 is positively avoided. The film transporting devices (see FIGS. 1 and 3) are therefore such that the film 24 is retreated from the mask every time it is advanced. When the advance has been made, the film is automatically replaced against the mask or masks. It should be noted that the magazine 3 can at any moment be replaced by the sighting device for a checking or an adjustment.

The man skilled in the art will understand that, owing to the presence of the positioning pins 53, the contact surfaces 51 and the film presser 27, the mask will always be positioned and placed relatively to the image. Furthermore, owing to the presence of the groove 14 of rear portion 5, corresponding to the rib of the intermediate housing 4, and to the positioning pins 17 fitting into the bores 18 of the rear portion 5, the position of intermediate housing 4 relative to the housing 2 will always be invariable. This exact positioning of the mask relative to intermediate housing 4 and of the latter to housing 2 allows an excellent image quality. This fact is particularly important since it is indispensable that the mask just realized must precisely be replaced into the ray bundle so that further photographs can be taken.

Those skilled in the art will further understand that the disclosed apparatus can be supported by an optical bench in order to realize images from transparent originals projected through the objective 10 by a condenser (not shown). To resume, the described apparatus allows the realisation of images with extreme precision using one or more masks of different thickness since the adjustment is always made in the film plane. Furthermore, the film advancing means always retreat the film from the mask during film transportation so that any film damage or defect is avoided. The parts of the apparatus can precisely be assembled so that, when housing 2 is adjusted to the subject, all intermediate operations can be made without need for a readjustment; all adjustments can be rechecked at any moment. The apparatus can also be used for making photographs, separations etc. on an optical bench to reproduce transparent originals, making special effects like fading in of texts or other information. The major advantage is however the fact that film masks can be made during the photographing of a subject whereas the apparatus of the prior art required a masking always in a dark room after imaging and on the base of developed original films.

The embodiment just described can of course be modified without departing from the scope and spirit of the invention. For example, the mask can be introduced at another location than adjacent to the film plane. The intermediate housing 4 could therefore be placed at any location between the objective 10 and the film plane. However, it should be noted that the image quality increases when the mask is approaching the film plane. The intermediate housing 4 could be introduced in a chamber of the housing 2 instead of being affixed against the housing 2, and the magazine 3 could be affixed to the housing 2. In such a case, positioning means for the intermediate housing 4 should be provided on the housing 2 so that the former could be removed and replaced in said chamber to occupy always the identical position.

Figures 6, 7, 8:
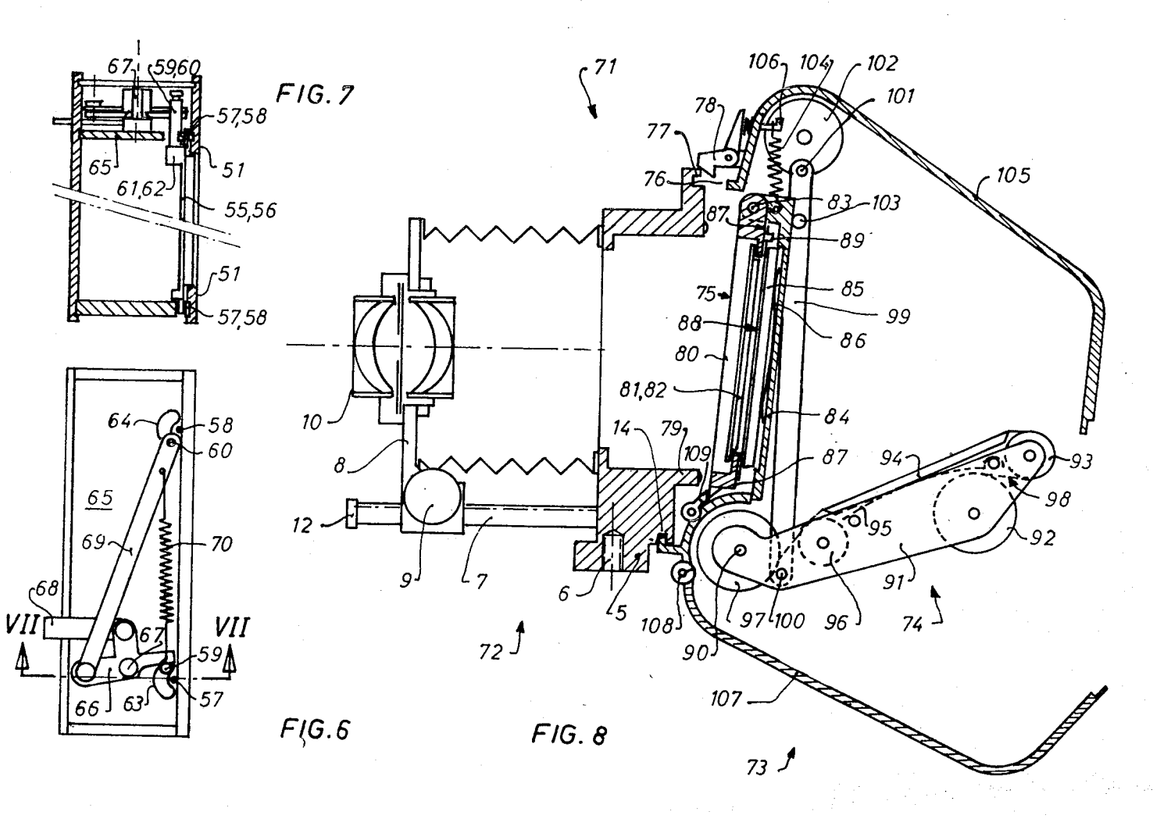
FIG. 6 is a top plan view in the direction of arrow A in FIG. 1 of the intermediate housing of FIGS. 1 and 4, with the upper plate closing the top of the intermediate housing being removed.
FIG. 7 is a sectional view taken along the line VII—VII of FIG. 6.
FIG. 8 is a longitudinal sectional view of a second embodiment of the photographic imaging apparatus, comprising a housing and a removable magazine, the latter being fitted with a mask positioning device and a film unwinding device.
Figure 9:
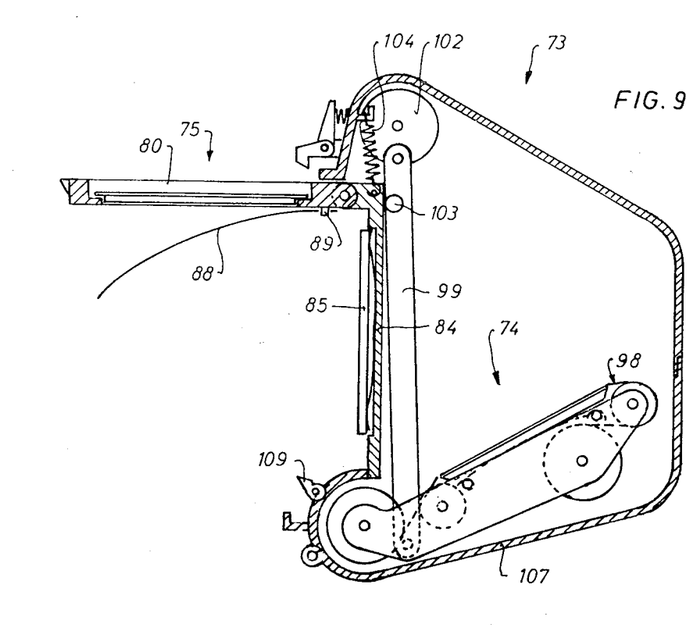
FIG. 9 is a sectional view of the magazine of the apparatus shown in FIG. 8 wherein the mask positioning device is open and the film unwinding device not operating.
Figure 10:
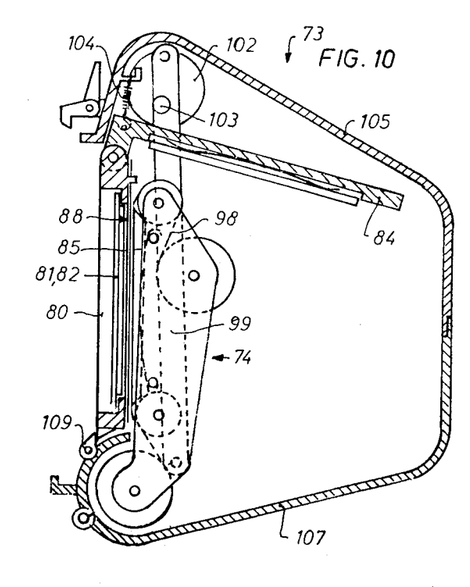
FIG. 10 is a sectional view of the magazine of the apparatus shown in FIG. 8 wherein the mask positioning device is closed and the film unwinding device in its operating position, in abutment agaitns the mask positioning device.

In the second embodiment shown in FIGS. 8 to 10, the apparatus 71 comprises a front housing 72 similar to housing 2 of the first embodiment, and a magazine 73 containing the film transporting device 74 as well as the mask positioning device 75. The housing 72 comprises a rear portion 5 with its lower threaded bore 6 to be fixed on a tripod (not shown), and a toothed rack 7 whereupon the objective support 8 is displaced by the action of a knob 9. The support 8 bears an objective 10 with its diaphragm and shutter, and it is connected to the rear portion 5 by a bellows 11. The objective 10 can be displaced forward and backward to effect distance adjustments. The rack 7 has at its foremost end a stop abutment 12 so that the objective support 8 cannot run out of the rack 7. The rear portion 5 comprises at its lower portion a groove 14 wherein a corresponding rib 15 of the magazine 73 can be inserted which is positioned relative to the rear portion 5 by a second rib 76 entering a groove 77 at the upper portion of piece 5. The magazine 73 is held against rear portion 5 by a hook or latch 78. The rear portion 5 further comprises a protruding device 75.

This mask positioning device 75 comprises a frame 80 having in its interior two shutter wings 81, 82 which are similar to the covers 55, 56 of the intermediate housing 4 in the embodiment of FIGS. 1 to 7. The opening and closing of wings 81, 82 is operated by shutter rod (not shown) in the same way as in the foregoing embodiment. The frame 80 is pivotably journalled about an axle 83, and its rear part is closed by a cover 84 comprising at its center a film presser 85 biassed by a spring 86. The frame 80 has supporting or contacting surfaces 87 on which a mask 88, introduced over two positioning pins 89, can be placed.

On the other side of the magazine 73, opposed to axle 83, the film transporting mechanism can be pivoted about the pivoting axle 90. This transporting mechanism comprises a frame 91 bearing a supply reel 92, a guide roller 93, a film presser 94 mounted on the frame 91 via a spring 95, a second guide roller 96, and a take-up reel 97, the rotation axis of which coincides with the pivoting axis of the device 74. The film 98 is thus unwound from the supply reel 92, goes around the guide roller 93 to the film presser 94, around the guide roller 96, and is wound up on the take-up reel 97. The film transporting control device is not shown in FIGS. 8 to 10. This device may be any conventional means moved by a handle or a motor. The pivoting of the film transporting device 74 is controlled by a rod 99 fixed, at one side, at 100 to the frame 91 and, on the other hand, to a control wheel 102. The rod comprises a retaining pin 103 arranged to hold in place the cover 84 of the mask positioning device 75, said cover being also biassed by the action of a spring 104 fixed to the casing 105 of the housing by a hook 106.

The casing 105 of the magazine 73 comprises a portion 107 pivotably journalled about an axle 108 so that the film transporting device 74 will be accessible. The magazine 73 further comprises in its interior a safety pin 109 which holds in place the mask positioning device 75 when the magazine 73 is separated from the rear portion 5 of the housing 72.

The operation of this second embodiment will easily be understood; reference is made to FIGS. 9 to 10.

First, the housing 72 of the apparatus is directed to a subject to be imaged with simultaneous masking. The magazine 73 is removed from the rear portion 5 of housing 72, which remains at its place, and magazine 73 is transported to a dark room where safety pin 109 is opened to pivot frame 80 upwardly. The mask positioning device 75 and the film transporting device 74 are then in the positions shown in FIG. 9. Now, the mask 88 is introduced on the positioning pins 89, and frame 80 is caused to pivot downwardly against the cover 84; when it is in contact therewith, the safety pin 109 is correctly replaced. The mask positioning device 15 is now in the position shown in FIG. 8. The wings 81 and 82 are closed, and the magazine 73 can be exposed to daylight and replaced against the rear portion 5 of housing 72. As already explained with the first embodiment, wings 81 and 82 automatically open when the magazine is placed. Now, the mask is sensibilized. The magazine 73 is again removed from the rear portion 5, goes to the dark room, the mask is developed, and the mask is replaced in the already described manner. Then the magazine 73 is replaced against the rear portion 5 in the already described way, and the wheel 102 is rotated half a turn to arrive in the position shown in FIG. 10. When the wheel passes from its position shown in FIG. 9 into that represented in FIG. 10, retaining pin 103 liberates the cover 84 which under the action of spring 104, is raised and pivots upwardly into the position shown in FIG. 10. Simultaneously, rod 99 is drawn upwardly too and brings the film transport device 74, swivelling about axis 90 (FIG. 8) in contact with the mask positioning device 55 until film 98 is pressed against mask 88 by the film presser 85. Now, one or more photographs can be made through the mask 88, it being understood that between two successive images, the device 74 is pivoted into the position shown in FIG. 9 to effect the film advance free from solid contact and thus to avoid any friction between the mask 88 and the advancing film 98. The magazine 73 is finally removed for its transfer to the dark room, and casing portion 107 of the housing 105 is lowered in order to give access to the film for its development.

The same way as the first embodiment of FIGS. 1 to 7, the second one just described can serve a plurality of purposes using all types of known masks. These masks may have any thickness whatsoever, and in general, several masks can be superimposed. In the second embodiment, the sighting device (not shown) is an independent one placed on the housing 72. It should be clear that the embodiment of FIGS. 8 to 10 can also be modified within the scope and spirit of this invention. For example, the housing 72 and the magazine 73 can be made of one sole piece or unit should one desire to simplify the apparatus. In this case, an upper opening should be provided in the housing 72 in order to make the mask positioning device accessible. It is further possible to vary the magazine 73 in providing it with a chamber destined for receiving the mask positioning device 75.

The originality of the apparatus of the invention and its embodiments and variants are not based upon the modifications discussed above but on the fact that it allows to execute the masking operations during the imaging of originals, and these masking operations may be as complex as those realized until now in special laboratories.

What is claimed is:

1. Apparatus for making a photographic picture on a film which is exposable in a film plane, said apparatus comprising:

a first housing; an objective in said first housing; an optical pathway through said first housing and through said objective thereof;

an intermediate housing, separably attachable to and separable from said first housing; said film plane being generally at said intermediate housing; said intermediate housing also having an optical pathway therethrough to said film plane;

said first and said intermediate housings together defining an optical pathway for optical communication between said objective and said film plane;

said intermediate housing incuding mask positioning means for positioning a mask generally in said film plane for intercepting light from said objective; said intermediate housing including shutter means positioned between said mask positioning means and said objective;

said intermediate housing further including a rear cover on the side of said mask positioning means away from said objective, and said cover being adapted to be separably attached to and to be separated from yet another part of said apparatus; and said another part of said apparatus being adapted to be separably attached to and to be separated from said intermediate housing cover at the side of said mask positioning means away from said objective, said another part of said housing being supported on said intermediate housing and not on said first housing, whereby upon separation of said intermediate housing from said first housing said another part of said apparatus stays with said intermediate housing.

2. The apparatus of claim 1 wherein said mask positioning means further comprises fixing means for allowing the precise positioning of a mask in a contact plane on said positioning means, and said contact plane is generally at said film plane.

3. The apparatus of claim 2 wherein said fixing means comprise at least two positioning pins for entering corresponding bores in the mask, said pins extending out from said mask contact plane.

4. The apparatus of claim 1, wherein said another part of said apparatus is a closure plate behind said mask for blocking light to said mask.

5. The apparatus of claim 1, wherein said another part of said apparatus comprises a photographic film containing magazine, including means for placing photographic film generally at said film plane.

6. The apparatus of claim 5, further comprising film advancing means for advancing film across said magazine; separating means for separating the film from a mask supported on said mask positioning means while said advancing means advances the film, and for moving the film toward the mask supported on said mask positioning means, so that both the mask and the film are generally in said film plane, following advancing of the film by said film advancing means.

7. The apparatus of claim 1, wherein said another part of said apparatus is a photographic film containing magazine.

8. The apparatus of claim 1, wherein said another part of said apparatus is a sighting device.

* * * * *